United States Patent

Lynch et al.

[15] 3,651,494

[45] Mar. 21, 1972

[54] FERROELECTRIC SYNCHRONIZING AND INTEGRATING APPARATUS

[72] Inventors: Frederick W. Lynch; Gerald F. Simons, both of Phoenix, Ariz.

[73] Assignee: Sperry Rand Corporation

[22] Filed: Mar. 27, 1970

[21] Appl. No.: 23,131

[52] U.S. Cl. ....................340/173.2, 330/69

[51] Int. Cl. ....................G11c 11/22

[58] Field of Search ....................340/173.2, 25–27; 330/69; 328/63

[56] References Cited

UNITED STATES PATENTS

| | | | |
|---|---|---|---|
| Re.23,813 | 4/1954 | Adler | 340/173.2 |
| 3,042,904 | 7/1962 | Brennemann et al. | 340/173.2 |
| 3,264,618 | 8/1966 | Wanlass et al. | 340/173.2 |
| 3,362,019 | 1/1968 | Gratian et al. | 340/173.2 |
| 3,505,641 | 4/1970 | Boskovich | 340/27 |
| 3,353,111 | 11/1967 | Van Wilson | 330/69 |
| 3,530,389 | 9/1970 | Gromley et al. | 330/69 |

*Primary Examiner*—Stanley M. Urynowicz, Jr.
*Attorney*—S. C. Yeaton

[57] ABSTRACT

Solid state synchronizing and integrating apparatus including a ferroelectric member having a permanently polarized motor section and a plurality of variably polarizable generator sections providing output signals in accordance with their instantaneous polarization in response to an excitation signal applied to the motor. Two generators are utilized in each integrator or synchronizer, one for storing and reading out signal information and the other functioning as a reference with which the signal information is compared. Switching and timing circuits are incorporated to provide for periodic updating of the stored signal information and allocation of discrete timing intervals for signal storage and read out.

18 Claims, 3 Drawing Figures

INVENTORS
FREDERICK W. LYNCH
GERALD F. SIMONS
BY
HP Terry
ATTORNEY

INVENTORS
FREDERICK W. LYNCH
GERALD F. SIMONS
BY
HP Terry
ATTORNEY

FERROELECTRIC SYNCHRONIZING AND INTEGRATING APPARATUS

BACKGROUND OF THE INVENTION

1. Field of the Invention

The present invention relates to ferroelectric devices and more particularly to integrators and synchronizers in which a ferroelectric member is utilized as an electrical data storage medium. Integrators and synchronizers have general utility, the latter being particularly useful in avionics systems as a command mechanism and for precluding transients that are likely to occur upon switching from one control mode to another in the course of operating an aircraft. In a flight condition where it is desired that certain sensor signals are to be rendered ineffective for controlling the craft, the synchronizer is operated such that it responds to a sensor signal in a manner to continuously update the information content of a storage medium and thereby provide an output signal that cancels the sensor signal. This is referred to as the synchronizing mode. In an alternative mode of operation, referred to as the clamp mode, the synchronizer discontinues the updating process whereupon the sensor signal, in the course of varying from the value it had immediately prior to clamp, is no longer cancelled by the synchronizing signal and thus becomes effective for controlling the craft.

2. Description of the Prior Art

In the past, integrators and particularly synchronizers have usually been constructed with electromechanical components although more recently solid state devices such as transfluxors have also been used in line with the prevailing trend toward microcircuit devices. Electromechanical components have the obvious disadvantage of being comparatively large and heavy and tend to be less reliable than solid state devices. The latter have also suffered from various problems such as complexity or high cost and in the case of magnetic devices, extremely low level output signals and susceptibility to stray magnetic fields and nuclear radiation. The present invention overcomes many disadvantages of the prior art devices by the provision of integrators and synchronizers utilizing a ferroelectric member as an electrical data storage element. Accordingly, small, highly reliable, low cost integrating and synchronizing apparatus having infinite memory and nondestructive readout capability is provided.

A ferroelectric material is one which exhibits a polarization versus applied voltage hysteresis characteristic similar to the magnetic induction versus applied magnetic field characteristic of magnetic devices and is thereby capable of functioning as a memory element by virtue of its inherent tendency to resist changes in its domain orientations after once being driven to a particular polarization condition. For use in analog integrator and synchronizer circuits the ferroelectric must be multiremanent, that is, it must be capable of having its polarization domain oriented in any of a multiplicity of distinguishable states in response to applied signals of correspondingly varying amplitudes. In addition, the material preferably should have a hysteresis with substantially straight parallel sloped sides as indicated in FIG. 3 of the drawings provided herewith to assure that the ferroelectric member can be switched by uniform amounts in response to applied pulses of fixed amplitude and duration.

Operation of the ferroelectric component used in the present invention is based on its electrostrictive and piezoelectric qualities relating respectively to its ability to be physically distorted in one region in response to an applied electric stress and in turn to produce an output signal at another region as a consequence of the deformation being transmitted thereto. In the early state of development of ferroelectric devices, these qualities were obtained by using two materials, one having good electrostrictive properties and the other good piezoelectric properties, affixed to one another in contacting relation. More recently, monomorphic structures comprising a single material have been employed resulting in higher output voltages even though the electrostrictive and piezoelectric properties of the material are not quite as good as those provided by a material exhibiting one or the other of these characteristics to a high degree. In the monomorphic devices, information is stored in one section commonly known as the generator. This is accomplished simply by applying an electric potential across this section whereupon its crystalline domains are oriented in accordance with the magnitude of the applied potential. Information can thereafter be read out of the generator section by applying an excitation signal to another section of the structure commonly known as the motor. Preferably, the motor is previously placed in a permanently polarized state by techniques well known in the art. This assures that, upon application of an excitation signal to the motor section, the structure will be deformed in the region of the motor in a manner to establish a resonant vibratory mode which is coupled to the generator section thereby producing an output voltage at the generator. The output voltage has the same frequency as that of the motor excitation signal and its phase relation to the motor excitation is dependent upon the state of the polarization of the generator in accordance with the information stored therein.

SUMMARY OF THE INVENTION

In a preferred embodiment of a synchronizer constructed according to the principles of the present invention, a signal from an input sensor coupled to the input terminal of the synchronizer is compared with an output signal generated in the synchronizer to produce an error (variable set) signal which is used to update the information in a generator (memory) section of the ferroelectric member. To achieve various advantages that will become apparent after reading the following description of the preferred embodiments, two generator sections are formed on the ferroelectric member. One of these serves as a reference generator with which a signal from the other (sensor) generator can be compared. In each cycle of synchronizer operation, the variable set signal is applied to the sensor generator for a prescribed time interval while a fixed set signal is applied to the reference generator. Prior to applying the set signals to the generator sections, however, block pulses are applied thereto to drive the generators into a saturated remanent polarization state. Then, the fixed set voltage operates to orient the domains of the reference generator in a remanent polarization state about midway between the saturation and the zero or randomly polarized states. At the same time, the variable set signal drives the sensor generator to a point above or below the polarization state of the reference generator accordingly as the variable set signal is less or greater than the fixed set voltage. The variable set voltage is not permitted to become so large, however, as to drive the sensor generator polarization across the zero axis of the hysteresis curve. Thereafter, upon the application of an excitation signal to the motor section, output signals are produced at each generator at a frequency corresponding to that of the excitation signal, the magnitude of each generator signal being inversely proportional to the displacement of its remanent polarization from the saturation state. To enhance the magnitude of the generator output signals, the excitation signal applied to the motor should be selected to correspond to the resonant frequency of the ferroelectric member along the extensory axis between the motor and generator sections. Since both generators operate in only half the range of the hysteresis curve, faster switching is realized and fatigue of the ferroelectric member is reduced. Moreover, the phase of the respective generator output signals is always the same. Consequently, only the magnitudes of the generator signals have to be compared. This is performed by respective rectifier circuits, one responding to the peak of the positive excursion of the AC output signal of one generator and the other to the peak of the negative-going excursion of the AC output signal of the other generator. The rectified output signals in turn are algebraically summed to produce a resultant difference signal. The resultant signal is applied through a sample and hold circuit to be compared with the synchronizer input signal. When the input signal and the signal from the sample and hold circuit are of equal amplitude, the variable set signal is adjusted to a level equal to that of the fixed set signal. Under these conditions, the signal coupled to the input terminal of the sample and hold circuit reduces to zero so that the voltage at the synchronizer output terminal remains constant. Operation continues in the foregoing manner with the synchronizer output signal, that is, the signal at the output terminal of the sample and hold circuit, periodically being updated to follow variations of the input sensor signal until such time as the synchronizer is placed in a clamped mode. At that instant, new information is no longer written into the sensor generator so that the voltage at the output of the sample and hold circuit remains at a constant level.

The ferroelectric apparatus of the present invention can also be adapted for use as an integrator by means of a slight modification in the associated circuits as will become apparent from the subsequent detailed description provided in conjunction with the appended drawings.

DESCRIPTION OF THE PREFERRED EMBODIMENTS

Figure 1:
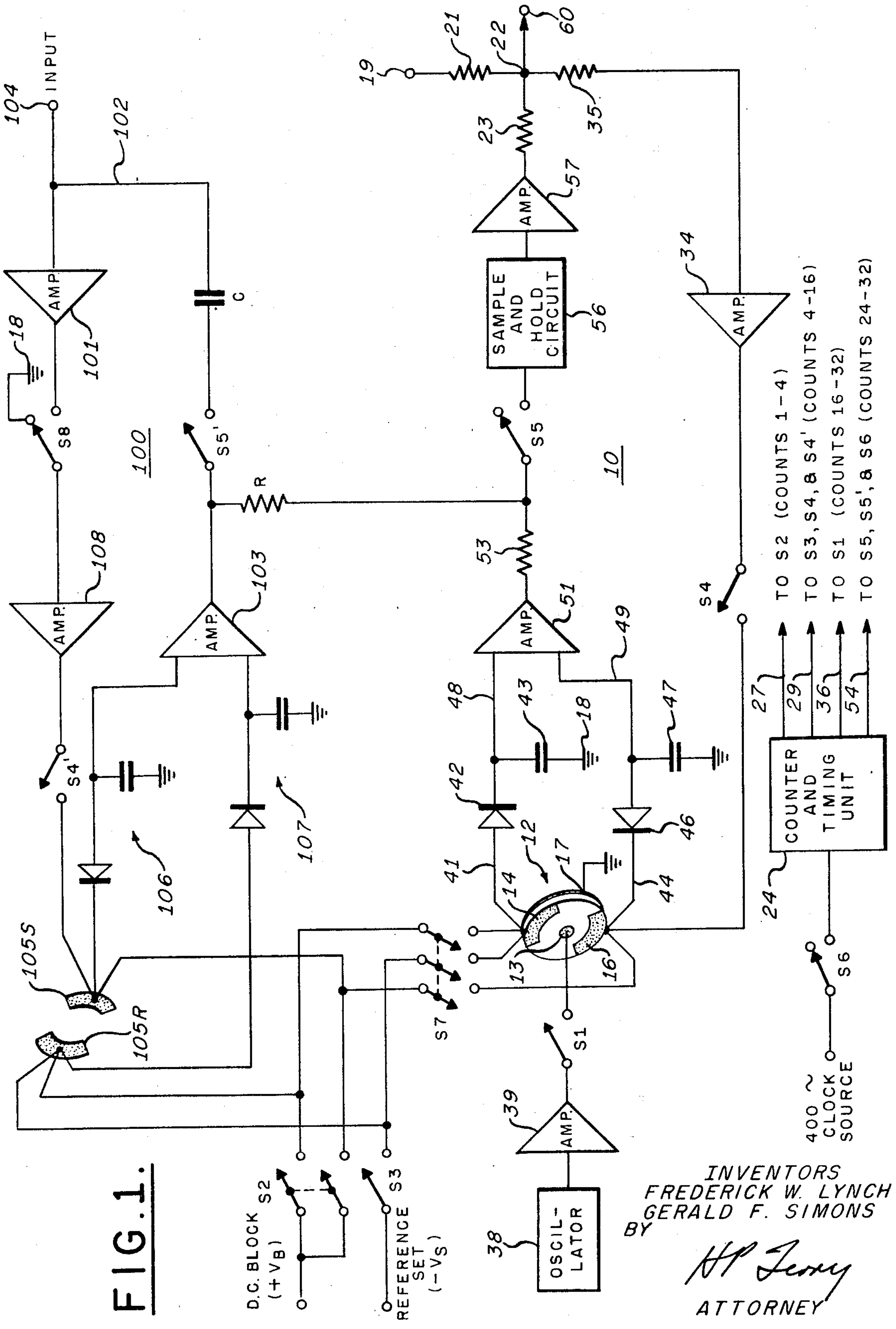
FIG. 1 is a schematic illustration of synchronizer and integrator embodiments of the invention.

Referring to FIG. 1, synchronizer 10 comprises a monomorphic unit including a thin disc-shaped, ferroelectric, crystalline member 12 having a motor, reference generator and sensor generator formed respectively by electrodes 13, 14 and 16 located on one side of the disc and electrode 17 affixed to the opposite side. Electrode 17 extends over the entire surface of the disc and is connected to ground 18. Coupling between the respective generator section is virtually eliminated by appropriately controlling the area of the generator electrodes relative to the thickness of the crystal. The crystal thickness, however, should be kept as small as practical since the magnitude of the required domain control voltages is directly proportional thereto. When operating in a synchronizing mode, the synchronizer compares an input sensor signal applied to input terminal 19 and coupled through resistor 21 to summing junction 22 with an output signal from the monomorphic unit coupled through resistor 23 to the summing junction whereat an error signal is produced which updates the information content of the sensor generator 16 (memory) of the monomorphic unit. The operational sequence of the synchronizer is controlled by counter and timing logic unit 24 which is driven by a 400 Hz. clock signal applied to its input terminal through switch S6. The counter resets to zero after every 32 cycles of the 400 Hz. clock signal thereby providing an 80-millisecond timing period for the synchronizer. This timing period enables the synchronizer to track and update input signals in the range from DC to approximately 12 Hz. which is adequate for most avionics applications. Obviously, shorter timing periods can be used to extend the frequency range of the equipment provided the response times of the various sections of the monomorphic unit are not exceeded.

Figure 2:
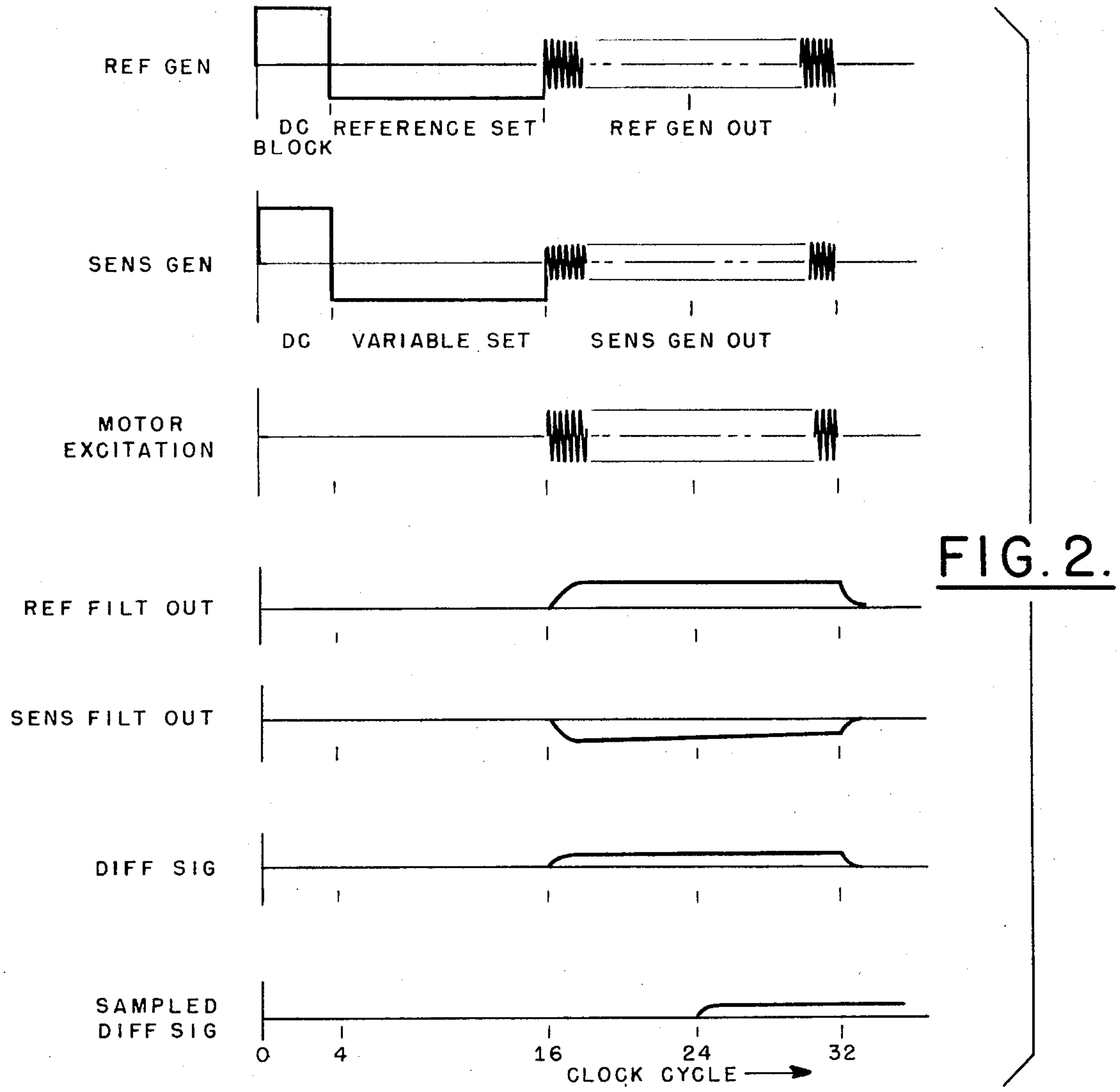
FIG. 2 shows various waveforms useful in explaining the operations of the FIG. 1 apparatus.
Figure 3:
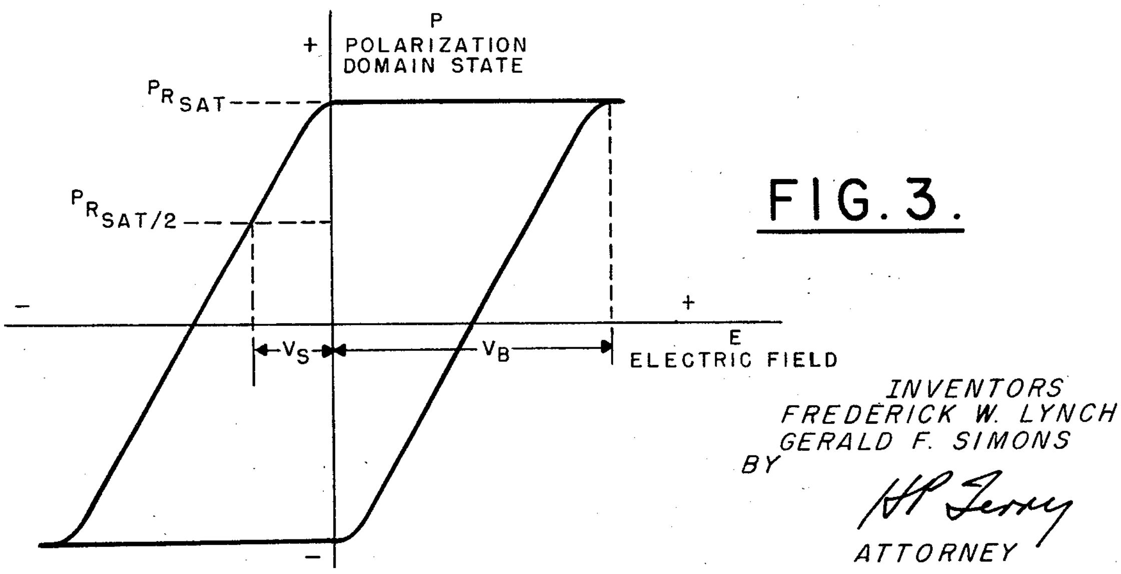
FIG. 3 depicts the polarization versus electrical field hysteresis characteristic of the ferroelectric member incorporated in the apparatus of FIG. 1.

Consider a sequence commencing at the instant when the counter has just reset to zero. Referring to FIGS. 2 and 3 in conjunction with FIG. 1, during the first four cycles of the clock signal, a signal is applied from the counter and timing logic unit on lead 27 to actuate switch S2 so that a DC BLOCK pulse of magnitude $+V_B$ is applied through the normally closed contacts of switch S7 to both the reference and sensor generators whereupon their polarization domains are driven into a remanent saturation state $P_{R\ sat}$. During the interval extending from the fourth to the 16th cycles of the clock signal, the counter and timing logic unit applies a signal on lead 29 to switches S3 and S4. Activation of switch S3 causes a REFERENCE SET pulse having a magnitude $-V_S$ equal to approximately half the magnitude of the DC BLOCK pulse to be applied to reference generator 14. This drives the reference generator out of the remanent saturation state to a polarization state $P_{R\ sat/2}$ located about half way between the zero and saturation states. At the same time closure of switch S4 couples the signal from summing junction 22 through resistor 35 and set amplifier 34 to sensor generator 16. For the condition where the error signal at the summing junction is equal to zero, the set amplifier provides a biased VARIABLE SET pulse at its output which is equal in amplitude to the REFERENCE SET pulse $-V_S$. Accordingly, the polarization of the sensor generator is driven to the same point as that of the reference generator. Thereafter, during the time interval extending from the 16th through the 32nd cycles of the clock signal, a signal is applied from the counter and timing logic unit on lead 36 to actuate switch S1 enabling a MOTOR EXCITATION signal from oscillator 38 to be applied through amplifier 39 to motor 13. As previously explained, the polarization in the vicinity of the motor is oriented in a prescribed state so that the monomorphic unit can resonate in a radial extensory mode thereby coupling the motor to the generators. Upon application of the oscillator signal to the motor, a signal of corresponding frequency and phase is produced in each generator. The oscillator voltage and frequency can vary within reasonable limits, about 3 to 4 percent, without seriously degrading operation. If desired, sensitivity to frequency changes can be reduced by immersing the ferroelectric member in a gelatinous material or otherwise controlling its physical environment. The generator signals are represented in FIG. 2 as REF GEN OUT and SENS GEN OUT and have a magnitude determined by the value of $P_{R\ sat/2}$ relative to the zero polarization axis of FIG. 3. Reference generator 14 is coupled by lead 41 to a filter comprising diode 42 which is poled so as to pass the positive going excursions of the REF GEN OUT signal into smoothing capacitor 43 connected at one end to the diode and at the other end to ground 18. Likewise, sensor generator 16 is coupled by lead 44 to diode 46 which is poled to pass the negative going portions of the SENS GEN OUT signal into smoothing capacitor 47 coupled at one end to diode 46 and at the other end to ground. The signals produced across capacitors 43 and 47 are depicted in FIG. 2 as REF FILT OUT and SENS FILT OUT respectively. Any difference in the responsivity of the generator sections can be corrected for by connecting an amplifier to the generator output prior to coupling to the filter. By careful design of the ferroelectric member, however, essentially perfect balance can be achieved between the generator sections. The filter output signals are connected by leads 48 and 49 to summing amplifier 51 wherein they combine algebraically to produce a signal proportional to their difference on output lead 52. The DIFF SIG is coupled through resistor 53 to the contacts of switch 55. Upon the occurrence of the 24th cycle of the clock signal a switch actuate signal is applied from the counter and timing logic unit on lead 54 causing switch S5 to close whereupon the DIFF SIG is coupled into sample and hold circuit 56, then through amplifier 57 to produce a SAMPLED DIFF SIG at the output thereof and finally through resistor 23 into summing junction 22, the gain and phase of amplifier 57 being adjusted to make the synchronizer loop gain compatible with the signal applied at input terminal 19. Alternatively, the phase (and gain) can be adjusted in amplifier 51 if desired or necessary to make the synchronizer operation compatible with the integrator which will be described hereinafter.

For the assumption made originally that the error signal in the summing junction is equal to zero and further assuming equivalence of resistors 21 and 23, the output of amplifier 57 will be equal in amplitude and of opposite polarity to the sensor input signal. As previously explained, a finite time will be required for this condition to be reached during the synchronizing mode. In the interim, the output of amplifier 57 will be different from the sensor input signal and the synchronizer will operate in a manner to make these signals equivalent. For instance, if the input sensor signal is initially positive and larger than the output of amplifier 57, a net negative error signal will be established at summing junction 22 such that the signal at the output of set amplifier 34 will become more negative than for the case of zero error at the summing junction. This will cause the remanent polarization of sensor generator 16 to be driven closer to zero and as a consequence the sensor generator output signal produced upon application of the motor excitation will be smaller than the reference generator output. Accordingly, the input to summing amplifier 51 will be a net positive signal resulting in a net negative signal at the output of amplifier 57, equaling or approaching the magnitude of the positive sensor input. Conversely, when the amplitude of the sensor input signal relative to the SAMPLED DIFF SIG at the output of amplifier 57 is such as to produce a net negative signal, the set amplifier output will become less negative and drive the remanent polarization of the sensor generator to a point between $P_{R\ sat}$ and $P_{R\ sat\ 2}$. Under this condition, the sensor generator output signal will exceed that of the reference generator and result in a larger positive signal at the output of amplifier 57 so as to reduce the summing junction error signal to zero.

It will be noted in the drawings that the filter outputs are shown to rise to a maximum value during the time immediately following count 16, as determined by the time constant of the filters, and thereafter slope slightly downward. The effect of this slope or droop in the filter output signals is negated, however, by virtue of summing these signals to produce a resultant signal which is compared with the sensor input. As previously mentioned, by careful design of the monomorphic ferroelectric unit the difference between the slopes of the respective generator signals can essentially be reduced to zero. Summing of filter output signals of opposite polarity therefore eliminates the droop from the DIFF SIG provided at the output of amplifier 51. Other advantages are also realized by means of this technique of summing reference and sensor signals. For instance, drift of the signal levels due to the effect on the crystal of temperature changes, shock, vibration and other environmental conditions are also cancelled as well as variations of transmissibility of the monomorph resulting from variations in the oscillator frequency. It is believed that the slope of the filter output signals occurs because the states in which the polarization domains tend to establish themselves in response to the reference and variable set pulses are not fixed with great rigidity and therefore have a tendency to relax. This relaxation in turn is attributed to the fact that the set pulses are applied for only a brief interval. In any case, the slope of the filter output signals has been found to be independent of the magnitude of the applied set voltages. It should be recognized, however, that the slope would not occur if a long duration set pulse was initially applied and then the generators were allowed to remain in that set condition. It is for this reason that the reference generator is continuously blocked and set in the same manner as the sensor generator. In other words, both are repeatedly updated to assure that both generator outputs droop in the same manner and thereby provide effective cancellation of the inherent droop as well as other drift errors.

When it is desired to memorize an existing signal condition, the synchronizer is placed in a clamp mode. This is effected by an operator actuating a control switch (not shown in the drawings) which opens switch S6 to intercept the clock pulse input to counter and timing logic unit 24. The operator signal functions in conjunction with a signal from timing unit 24 to preclude switch S6 from opening until the 24th cycle of the clock pulse. Thus, change over to the clamp mode is accomplished only after the DIFF SIG at the output of amplifier 51 has settled to a value based on the immediately preceding pulse level applied to the sensor generator. During the clamp mode switches S1 and S5 remain continuously closed, as by the application thereto of energizing signals from counter unit 24, so that excitation is continuously applied to motor 13 for reading out the reference and sensor generator signals and the difference therebetween is continuously applied to sample and hold circuit 56. It will be understood, of course, that initiation of clamp between the 24th and 32nd cycles of any synchronizer period will result in immediate switchover to the clamp mode. While in the clamp mode any variation of the input sensor signal from its level prior to clamping will produce a resultant signal on lead 60 which is adapted for coupling to a system that is to be controlled by the sensor signal.

To return to the synchronizing mode the operator actuated switch is returned to its original position thereby enabling switch S6 to close again whereupon counter 24 is reset to zero, switches S1 and S5 are opened, and a new synchronizing period is commenced.

As a further refinement to the synchronizing apparatus described herein it should be noted that the monomorphic ferroelectric unit 11 can be replaced by a bimorph bender which comprises two monomorphs physically affixed to one another. In this configuration, excitation of one of the monomorphs at its resonant frequency causes it to tend to change size as previously described but since it is restricted by the other monomorph the entire structure bends in the manner of a bimetallic strip exposed to heat. This bending action produces a substantially larger output signal than is obtained with simple radial expansion of the ferroelectric member.

Operation of the integrator 100 shown in FIG. 1 is substantially the same as that of the synchronizer with the exception of minor differences which will become apparent in the ensuing discussion. To overcome the leakage inherent in a conventional electronic integrator of the type utilizing an operational amplifier having a capacitor connected across the amplifier input and output terminals some provision must be made to hold the integrator output constant upon removal of the input signal. This is accomplished in the integrator apparatus of the present invention by constructing the circuit such that the high potential side of the capacitor is supplied from an independent source of infinite memory, namely, a generator section of a ferroelectric unit. Accordingly, the resistive input-output summing network of the synchronizer is replaced with an operational amplifier 101 operating in conjunction with a feedback capacitor C having one of its terminals connected by lead 102 to the input of the operational amplifier and its other terminal connected through switch S5' to the output of summing amplifier 103. Upon application of an input signal to the input terminal 104 and under the condition where switch S8 is closed, as by an operator to enable the circuit to function as an integrator, operation proceeds in the manner described with reference to the synchronizer. Thus, each generator section $\mathbf{105}_S$ and $\mathbf{105}_R$ is sequentially blocked, set and read out, the output voltages being applied through the filter networks 106 and 107 to amplifier 103 to produce a difference signal for application to the operational amplifier in opposition to the input signal by way of switch S5' and capacitor C. Set amplifier 108 includes appropriate biasing means as in the case of synchronizer set amplifier 34 so that the signal generator $\mathbf{105}_S$ is always driven to a remanent polarization state located between the zero state and one saturation state irrespective of the polarity of the input signal. For simplicity of illustration, the motor section and its related circuits have not been shown in the integrator. It should be understood, however, that the integrator generator sections can be incorporated on the same ferroelectric unit with the synchronizer generators in readiness for all to be excited by a single motor.

When the integrator is not in use or if it is desired to reduce its output to zero after having been in use, switch S8 is moved to connect the input of the set amplifier 108 to the ground terminal. As indicated in the drawing, the integrator can be coupled through a resistor R into the synchronizer 10. Thus, in an aircraft application, for instance, the integrator can be used for applying a command to the aircraft control system or for augmenting the craft attitude during a clamp mode of the synchronizer. This is conveniently accomplished by opening switch S7 to isolate the synchronizer and integrator generator sections relative to the blocking and reference set signals and additionally providing separate leads from counter and timing logic unit 24 to switches S4 and S4' and switches S5 and S5'.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A ferroelectric circuit comprising input means for receiving an input signal, a ferroelectric member having a motor section and at least one pair of generator sections, said motor section being permanently polarized in a predetermined polarization state and having coupling means attached thereto adapted for connection to a source of electrical excitation, said generator sections having a polarization versus electrical field hysteresis characteristic such that the polarization of said generator sections can be driven to any of a multiplicity of remanent states and being responsive to the excitation applied to said motor section for providing respective generator output signals representative of the remanent polarization state of the individual generators, summing means coupled to said input means and said pair of generator sections for algebraically adding said input signal with a difference signal derived from said generators, reference signal means coupled to one of said pair of generator sections for applying electrical excitation thereto to drive said one generator to a given remanent polarization state, input signal means coupling the output of said summing means to the other of said pair of generator sections for driving said other generator to a remanent polarization state determined in accordance with the magnitude of the signal provided at said summing means output, and output coupling means including differential means connected to said generator sections for subtractively combining said generator output signals to produce said difference signal in opposition to said input signal.

2. The apparatus of claim 1 wherein said output coupling means further includes a capacitor connected between the output of said differential means and the input of said summing means.

3. The apparatus of claim 1 including blocking means coupled to said generator sections for applying a pulse thereto to drive said generators into a saturated polarization state prior to driving them to their respective remanent polarization states.

4. The apparatus of claim 1 wherein said input signal coupling means includes first switching means for selectively opening the circuit connection between said summing means output and said one generator whereupon opening of said first switching means said difference signal becomes clamped at a fixed level.

5. The apparatus of claim 4 wherein said reference signal coupling means includes second switching means, said output coupling means includes third switching means and said motor coupling means includes fourth switching means; said third and fourth switching means being actuated to a closed condition only during the open condition of said first and second switching means and conversely.

6. The apparatus of claim 5 wherein said summing means comprises an operational amplifier and said output coupling means further includes a capacitor serially connected with said third switching means between the output of said differential means and the input of said operational amplifier to which one terminal of said capacitor is connected.

7. The apparatus of claim 5 wherein said third switching means is actuated to a closed condition only during part of the closed interval of said fourth switching means.

8. The apparatus of claim 1 wherein said reference signal coupling means is operative to drive said one generator to a remanent polarization state intermediate the zero polarization state and a saturated polarization state, and said input signal coupling means includes means for biasing said summing means output signal in a manner to drive said other generator to a polarization state of the same polarity as said one generator irrespective of the polarity of said summing means output signal.

9. The apparatus of claim 8 wherein said differential means includes oppositely poled rectifier circuits each connected to a respective generator section.

10. The apparatus of claim 8 wherein said input signal coupling means, said reference signal coupling means, said output coupling means and said motor coupling means include first, second, third and fourth switching means respectively and further including fifth switching means connected to said generator sections for applying blocking pulses thereto to drive said generators to a saturated polarization state of the same polarity during a first timing interval, said first and second switching means being actuated to a closed condition during a second timing interval, said fourth switching means being actuated to a closed condition during a third timing interval, and said third switching means being actuated to a closed condition during the latter part of said third interval.

11. The apparatus of claim 10 wherein said summing means comprises an operational amplifier and said output coupling means further includes a capacitor in series connection between said third switching means and the input of said operational amplifier.

12. The apparatus of claim 10 wherein said differential means includes oppositely poled rectifier circuits each connected to a respective generator section.

13. The apparatus of claim 12 including an output terminal of said ferroelectric circuit connected to said summing means output and adapted for coupling to external utilization means.

14. The apparatus of claim 12 further comprising a timing control unit including a counter for cyclically actuating said switches in the aforestated manner, and a source of clock pulses for driving said counter.

15. The apparatus of claim 14 including an oscillator for supplying a source of alternating current excitation to said motor section.

16. The apparatus of claim 15 wherein said ferroelectric member comprises a planar ferroelectric crystal having a common electrode affixed to one planar surface and a plurality of electrodes affixed to the opposite planar surface such that said motor and generator sections are formed by the region of ferroelectric material intermediate said common electrode and the individual electrodes of said plurality.

17. A ferroelectric synchronizer comprising input means for receiving an input signal, a ferroelectric member including a motor section adapted to receive an excitation signal and at least two generator sections, said ferroelectric member having a polarization versus applied voltage hysteresis characteristic such that the polarization of the generator sections can be driven to any of a multiplicity of remanent polarization states, means for applying a blocking pulse to the generator sections during a first time interval to drive them into a saturated polarization state, means for applying a variable set signal to one generator section and a fixed set signal to another generator section during a second time interval such that the polarization of the respective generator sections is driven out of the saturated state toward the zero polarization level by an amount proportional to the magnitude of the respective set signals, means for applying an excitation signal to said motor section during a third time interval to produce respective output signals at said one and said another generator sections in response to said excitation signal, means for subtractively combining the output signals of said one and said another generator sections to produce a signal representative of the difference therebetween, means for sampling and retaining said difference signal during at least part of said third time interval, and means for summing said sampled difference signal in opposition to said input signal to produce said variable set signal.

18. A ferroelectric integrator comprising an operational amplifier, input means coupled to said operational amplifier for applying an input signal thereto, a ferroelectric member including a motor section adapted to receive an excitation signal and at least two generator sections, said ferroelectric member having a polarization versus applied voltage hysteresis characteristic such that the polarization of the generator sections can be driven to any of a multiplicity of remanent polarization states, means for applying a blocking pulse to the generator sections during a first time interval to drive them into a saturated polarization state, means for applying a variable set signal to one generator section and a fixed set signal to another generator section during a second time interval such that the polarization of the respective generator sections is driven out of the saturated state toward the zero polarization level by an amount proportional to the magnitude of the respective set signals, means for applying an excitation signal to said motor section during a third time interval to produce respective output signals at said one and said another generator sections in response to said excitation signal, means for subtractively combining the output signals of said one and said another generator sections to produce a signal representative of the difference therebetween, means for sampling the signal provided at the output of said subtractive combining means during at least part of said third time interval, and capacitive means coupling said sampling means to the input of said operational amplifier for applying said sampled signal thereto in opposition to said input signal.

* * * * *